(12) United States Patent
Jetcheva et al.

(10) Patent No.: US 10,505,845 B2
(45) Date of Patent: *Dec. 10, 2019

(54) TECHNIQUES FOR ENABLING THE EFFICIENT OPERATION OF ARBITRARILY INTERCONNECTED MESH NETWORKS

(71) Applicant: FIRETIDE, INC., Campbell, CA (US)

(72) Inventors: Jorjeta Gueorguieva Jetcheva, Los Gatos, CA (US); Sivakumar Kailas, San Jose, CA (US); Mohan Natarajan, San Ramon, CA (US)

(73) Assignee: Firetide, Inc., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/611,212

(22) Filed: Jan. 31, 2015

(65) Prior Publication Data

US 2015/0381489 A1    Dec. 31, 2015

Related U.S. Application Data

(63) Continuation of application No. 13/441,726, filed on Apr. 6, 2012, now Pat. No. 8,948,015, which is a
(Continued)

(51) Int. Cl.
*H04W 40/24* (2009.01)
*H04L 12/741* (2013.01)
(Continued)

(52) U.S. Cl.
CPC .............. *H04L 45/74* (2013.01); *H04L 45/04* (2013.01); *H04L 45/122* (2013.01);
(Continued)

(58) Field of Classification Search
CPC ......... H04L 45/74; H04L 45/04; H04L 45/26; H04L 45/124; H04L 45/122; H04L 45/32; H04W 40/246; H04W 84/18
See application file for complete search history.

(56) References Cited

U.S. PATENT DOCUMENTS 5,805,805 A * 9/1998 Civanlar ............. H04L 12/4608
                                                           370/409
6,865,185 B1* 3/2005 Patel ...................... H04L 47/12
                                                           370/310
(Continued)

FOREIGN PATENT DOCUMENTS

CN          1467961 A       1/2004
WO       2005057834 A2     6/2005

OTHER PUBLICATIONS

Examination Report for Indian Application No. 1144/DELNP/2008, dated Jun. 30, 2016, 7 pages.

(Continued)

*Primary Examiner* — Phuc H Tran
(74) *Attorney, Agent, or Firm* — PatentVentures; Bennett Smith; Korbin Van Dyke (57) ABSTRACT

Wireless mesh networks (or "meshes") are enabled for arbitrary interconnection to each other and may provide varying levels of coverage and redundancy as desired. Interoperability between meshes having differing configurations, internal operations, or both, may be freely intermixed and inter-operated in unrestricted combination. Enhanced explicit inter-bridge control protocols operate using pre-existing control packets. Pre-existing broadcast packet floods are used to learn the best paths across interconnected meshes (termed a "multi-mesh"). Enhanced routing protocols operating within each mesh may optionally examine information limited to the respective mesh when forwarding traffic, thus enabling robust multi-mesh scaling with respect to memory and processing time required by the routing protocols. Using assigned identifiers, forwarding loops are prevented, and optionally redundant broadcast flooding is prevented.

20 Claims, 3 Drawing Sheets

Related U.S. Application Data continuation of application No. 12/014,811, filed on Jan. 16, 2008, now Pat. No. 8,155,008, which is a continuation of application No. PCT/US2006/028008, filed on Jul. 19, 2006.

(60) Provisional application No. 60/806,527, filed on Jul. 3, 2006, provisional application No. 60/709,743, filed on Aug. 19, 2005, provisional application No. 60/707,069, filed on Aug. 10, 2005, provisional application No. 60/701,446, filed on Jul. 21, 2005.

(51) Int. Cl.
*H04L 12/715* (2013.01)
*H04L 12/733* (2013.01)
*H04L 12/721* (2013.01)
*H04W 84/18* (2009.01)

(52) U.S. Cl.
CPC ............ *H04L 45/124* (2013.01); *H04L 45/26* (2013.01); *H04L 45/32* (2013.01); *H04W 40/246* (2013.01); *H04W 84/18* (2013.01)

(56) References Cited

U.S. PATENT DOCUMENTS

| | | | | |
|---|---|---|---|---|
| 7,366,176 | B1* | 4/2008 | Sundaresan | H04L 45/04 370/238 |
| 7,619,966 | B2* | 11/2009 | Lee | H04L 12/462 370/218 |
| 7,801,110 | B2* | 9/2010 | Anjum | H04L 45/00 370/351 |
| 8,199,636 | B1* | 6/2012 | Rouyer | H04L 69/40 370/218 |
| 2002/0093910 | A1* | 7/2002 | Yazaki | H04L 49/505 370/229 |
| 2004/0001008 | A1* | 1/2004 | Shuey | H04Q 9/00 340/870.02 |
| 2004/0103275 | A1* | 5/2004 | Ji | H04L 45/54 713/150 |
| 2004/0174887 | A1* | 9/2004 | Lee | H04L 12/462 370/395.53 |
| 2004/0190454 | A1* | 9/2004 | Higasiyama | H04L 12/4625 370/238 |
| 2004/0235468 | A1* | 11/2004 | Luebke | H04W 16/14 455/426.1 |
| 2005/0152305 | A1* | 7/2005 | Ji | H04L 45/54 370/328 |
| 2005/0163050 | A1* | 7/2005 | Hopkins | H04L 43/50 370/231 |
| 2005/0243837 | A1* | 11/2005 | Boyd | H04L 45/00 370/395.52 |
| 2005/0249215 | A1* | 11/2005 | Kelsey | H04L 45/34 370/392 |
| 2006/0036765 | A1* | 2/2006 | Weyman | H04L 49/15 709/245 |
| 2006/0083255 | A1* | 4/2006 | Rouyer | H04L 12/462 370/402 |
| 2006/0133286 | A1* | 6/2006 | Elie-Dit-Cosaque | H04L 45/00 370/249 |
| 2006/0221949 | A1* | 10/2006 | Anjum | H04L 45/00 370/389 |
| 2006/0245376 | A1* | 11/2006 | Ge | H04L 12/462 370/256 |
| 2006/0256724 | A1* | 11/2006 | Martini | H04L 45/04 370/238 |
| 2007/0280192 | A1* | 12/2007 | Yagyu | H04L 12/4625 370/349 |

OTHER PUBLICATIONS

The State Intellectual Property Office of the People's Republic of China, Application No. 2012105674410 Office Action and Search Report, dated Apr. 27, 2015, 7 pages.

* cited by examiner

TECHNIQUES FOR ENABLING THE EFFICIENT OPERATION OF ARBITRARILY INTERCONNECTED MESH NETWORKS

CROSS REFERENCE TO RELATED APPLICATIONS

Priority benefit claims for this application are made in the accompanying Application Data Sheet. This application incorporates by reference for all purposes the following applications, which are all owned by the owner of the instant application:

U.S. Nonprovisional application Ser. No. 13/441,726, filed Apr. 6, 2012, first named inventor Jorjeta Jetcheva, and entitled Method for Enabling the Efficient Operation of Arbitrarily Interconnected Mesh Networks, now U.S. Pat. No. 8,948,015;

U.S. Nonprovisional application Ser. No. 12/014,811, filed Jan. 16, 2008, first named inventor Jorjeta Jetcheva, and entitled Method for Enabling the Efficient Operation of Arbitrarily Interconnected Mesh Networks, now U.S. Pat. No. 8,155,008;

PCT Application Serial No. PCT/US2006/028008, filed Jul. 19, 2006, first named inventor Jorjeta Jetcheva, and entitled Method for Enabling the Efficient Operation of Arbitrarily Interconnected Mesh Networks; and U.S. Provisional Application Ser. No. 60/701,446, filed Jul. 21, 2005, first named inventor Jorjeta Jetcheva, and entitled Method for Enabling the Efficient Operation of Arbitrarily Interconnected Mesh Networks; and U.S. Provisional Application Ser. No. 60/707,069, filed Aug. 10, 2005, first named inventor Jorjeta Jetcheva, and entitled Method for Enabling the Efficient Operation of Arbitrarily Interconnected Mesh Networks;

U.S. Provisional Application Ser. No. 60/709,743, filed Aug. 19, 2005, first named inventor Jorjeta Jetcheva, and entitled Method for Enabling the Efficient Operation of Arbitrarily Interconnected Mesh Networks; and U.S. Provisional Application Ser. No. 60/806,527, filed Jul. 3, 2006, first named inventor Jorjeta Jetcheva, and entitled Method for Enabling the Efficient Operation of Arbitrarily Interconnected Mesh Networks.

BACKGROUND

Field

Advancements in routing protocols for bridging networks are needed to provide improvements in performance, efficiency, and utility of use. Embodiments described elsewhere herein enable the improvements.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. An exposition of one or more embodiments of the invention is provided in the Detailed Description. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification. As is discussed in more detail in the Conclusions, the invention encompasses all possible modifications and variations within the scope of the issued claims, which are appended to the very end of the issued patent.

Various embodiments relate to low overhead and low complexity techniques for enabling arbitrarily interconnected mesh networks to communicate information efficiently, enabling scalability and interoperability. A network formed as a result of interconnecting a set of mesh networks is referred to as a multi-mesh. Each of the mesh networks of the multi-mesh may have a respective (and possibly unique) internal configuration and operational modes. The techniques provide for all unicast packets to travel a corresponding best path across the interconnected meshes, and for avoiding forwarding loops of unicast and broadcast packets. The techniques further provide for forwarding packets along best paths across the multi-mesh when considered as a whole. Routing information and processing thereof are constrained to and are specific to each respective mesh of the multi-mesh, thus reducing routing processing and memory requirements compared to scenarios having all nodes in a single mesh.

Terms

Elsewhere herein terms are used to describe selected elements and aspects of various embodiments and implementations. Examples for selected terms follow.

Node: An example of a node is an electronic device.

Packet: An example of a packet is that nodes communicate information to each other that is subdivided into packets.

Link: An example of a link is a conceptual representation of the ability of two (or more) nodes to communicate with each other. A link may be wired (the nodes being connected by a physical medium for carrying information such as electrical or optical interconnect) or wireless (the nodes being connected without a physical medium, e.g., via radio technology).

Path/Route: An example of a path/route is a sequence of one or more links.

Path Metric: An example of a path metric is a number that reflects the desirability of a path. For example, the number of links, e.g., the hop count of a path, is one possible metric. Paths with a lower hop count have advantages over paths with a higher hop count. The advantages include less resource usage (as there is reduced forwarding) and less likelihood of lost packets (as there are fewer chances for loss before packets reach respective destinations).

Best Path: An example of a best path is an ordered list of nodes that when transited (in order) by a packet result in an efficient traversal from a source to a destination, according to predetermined criteria. Since parameters and operating conditions vary over time, any best path is also a "known" best path; e.g. it is based on criteria evaluated at a particular point in time, and at a different point in time a different best path may be available. Best paths may also be considered to be "most nearly optimal" according to one or more metrics as measured with respect to a routing protocol responsible for determining the best paths.

Network: An example of a network is a set of nodes that are enabled to communicate with each other via any combination of wired and wireless links.

Mesh Network: An example of a mesh network is a set of nodes that self-organize into a multi-hop network. In some usage scenarios the mesh network has limited resources (e.g. available bandwidth, available computational power, and available energy).

Multi-Mesh Network: An example of a multi-mesh network is a set of interconnected meshes appearing to operate as a single network from a perspective of a user of resources provided by the multi-mesh network.

Shared Access Network: An example of a shared access network is a network such that a packet transmitted by any node is overheard by all other nodes in the network. An example implementation of such a network is an 802.3 LAN.

Ingress Mesh: An example of an ingress mesh is a mesh where a packet enters a multi-mesh.

Egress Mesh: An example of an egress mesh is a mesh where a packet exits (or leaves) a multi-mesh.

Ingress Mesh Node: An example of an ingress mesh node is a node where a packet enters a mesh; e.g. the node forwarding the packet from a non-mesh link onto a mesh link/network.

Egress Mesh Node: An example of an egress mesh node is a node where a packet exits a mesh; e.g. the node forwarding the packet from a mesh link onto a non-mesh link/network.

Mesh Bridge (Node): An example of a mesh bridge is a node that is simultaneously participating in more than one mesh network at a time; e.g. the node is coupled to at least two mesh networks at once. Bridge nodes enable nodes connected on a first mesh (or that are part of the first mesh) to communicate with nodes connected on a second mesh (or that are part of the second mesh).

(Mesh) Bridge Link: An example of a mesh bridge link is a link between two bridge nodes (each being coupled to a respective mesh) used to forward traffic between the two meshes.

Ingress Bridge Node: An example of an ingress bridge node is the mesh bridge where a packet exits (or leaves) an ingress mesh.

Egress Bridge Node: An example of an egress bridge node is the mesh bridge where a packet enters an egress mesh.

Mesh Portal: An example of a mesh portal is a node that is part of a mesh network and is also connected to another (shared access) network. Mesh portals enable nodes connected to the mesh, or that are part of the mesh, to communicate with nodes that are part of the shared access network, or that may be reached through the shared access network. In some embodiments the mesh network appears to outside networks as a transparent layer-2 transport, i.e. a packet injected into the mesh at one portal exits the mesh at another portal unmodified.

Ingress Mesh Portal: An example of an ingress mesh portal is the portal at which a packet enters a mesh, e.g., the portal that forwards the packet from a non-mesh link/network onto a mesh link/network.

Egress Mesh Portal: An example of an egress mesh portal is the portal at which a packet exits the mesh, e.g., the portal that forwards the packet from a mesh link/network onto a non-mesh link/network.

Mesh Client Interface: An example of a mesh client interface is an interface (that is part of a node of a mesh network) for coupling to a client device.

Mesh Network Gateway Interface (mesh NGI): An example of a mesh NGI is a node that is part of a mesh network (e.g., has an interface configured to be part of the mesh network) and is also connected to another network (e.g., has an interface configured to be on the other network). Mesh NGIs enable nodes connected to a mesh network, or that are part of the mesh, to communicate with nodes that are part of a shared access network, or that may be reached through the shared access network. In some embodiments the mesh network appears to outside networks as a transparent layer 2 transport: a packet injected into the mesh at one NGI exits the mesh at another NGI or Client Interface unmodified.

Ingress Mesh Interface: An example of an ingress mess interface is an interface at which a packet enters a mesh, e.g., the interface that forwards the packet from a non-mesh link onto a mesh link/network.

Egress Mesh Interface: An example of an egress mesh interface is the interface at which a packet exits the mesh, e.g., the interface that forwards the packet from a mesh link onto a non-mesh link/network.

Unicast: An example of unicast is communication between two nodes.

Broadcast: An example of broadcast is communication from one node intended to reach a plurality of nodes. In some usage scenarios the plurality of nodes includes all nodes on a network. In some scenarios a broadcast may not reach all intended nodes (due to packet loss, for example).

Flood: An example of a flood is a broadcast sent by a node that is in turn rebroadcast by every other node receiving the broadcast, thus potentially reaching all nodes in a network.

Routing Protocol: An example of a routing protocol is a set of mechanisms implemented on each node in a mesh network, wherein the mechanisms serve to discover information about the network and enable each node on the network to communicate with other nodes of the network, even when the other nodes are multiple hops away from the respective node.

Path Accumulation: An example of path accumulation is when each node forwarding a packet adds its respective address to the packet.

Illustrative Combinations

The following is a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first embodiment comprising a method comprising operating first and second wireless mesh networks; via a bridge link coupling the wireless mesh networks, forming a multi-mesh network by forwarding packets between the wireless mesh networks; and preventing forwarding loops between the wireless mesh networks. The aforementioned embodiment wherein the preventing of forwarding loops comprises assigning identifiers to packets. The aforementioned embodiment wherein the packets include broadcast packets. The aforementioned embodiment wherein each identifier comprises a source address field based on a source address corresponding to a node generating the identifier. The aforementioned embodiment wherein each identifier further comprises an identification field uniquely identifying each respective packet in a context of an associated entry point into the multi-mesh network. The aforementioned embodiment wherein the associated entry point is an ingress mesh node. The aforementioned embodiment wherein the identifiers are included in pre-existing control packets. The first embodiment wherein the preventing of forwarding loops comprises assigning identifiers to broadcast and unicast packets.

The first embodiment comprising forwarding a unicast packet according to a best path. The aforementioned embodiment wherein the best path is determined according to paths learned from accumulated path cost information. The aforementioned embodiment wherein the determining of the best path is at least partially in response to forwarding a packet. The aforementioned embodiment wherein the accumulated path cost information is accumulated in at least one of a pre-existing control packet and a pre-existing data packet. The aforementioned embodiment wherein the accumulated path cost information is a cost of forwarding a packet through each mesh the packet has traversed.

A second embodiment comprising a method comprising operating first and second wireless mesh networks, via a bridge link coupling the wireless mesh networks, forming a multi-mesh network by forwarding packets between the wireless mesh networks; and eliminating redundant broadcast flooding within each respective wireless mesh network. The aforementioned embodiment wherein the eliminating of redundant broadcast flooding comprises assigning identifiers to packets. The aforementioned embodiment wherein each identifier comprises a source address field based on a source address of the packet corresponding to the identifier. The aforementioned embodiment wherein each identifier comprises an identification field uniquely identifying each respective packet in a context of an associated entry point into the multi-mesh network. The aforementioned embodiment wherein the identifiers are included in pre-existing control packets.

A third embodiment comprising a method comprising operating first and second wireless mesh networks, via a bridge link coupling the wireless mesh networks, forming a multi-mesh network by forwarding packets between the wireless mesh networks; and forwarding packets according to efficient routes based at least in part on route cost information. The aforementioned embodiment wherein the route cost information is accumulated in packets during bridge link traversal. The aforementioned embodiment wherein the route cost information is included in pre-existing control packets.

Any of the first, second, and third embodiments wherein the bridge link is a wireless link. Any of the first, second, and third embodiments wherein the bridge link is a plurality of wireless links. Any of the first, second, and third embodiments wherein the bridge link is a wired link. Any of the first, second, and third embodiments wherein the bridge link is a plurality of wired links. Any of the first, second, and third embodiments wherein the bridge link comprises at least one wireless link and at least one wired link.

Any of the first, second, and third embodiments wherein the first and the second wireless mesh networks operate according to frequency diversity. The foregoing embodiments wherein the frequency diversity comprises operating the first and the second wireless mesh networks according to distinct frequency spectra. Any of the first, second, and third embodiments wherein the first and the second wireless mesh networks operate according to respective first and second frequency allocations. Any of the first, second, and third embodiments wherein the first and the second wireless mesh networks operate according to respective first and second frequency allocations and at least one of the frequency allocations corresponds to an 802.11 compatible channel. Any of the first, second, and third embodiments wherein the first and the second wireless mesh networks operate according to respective first and second frequency allocations and at least one of the frequency allocations corresponds to at least one of an 802.11a, an 802.11b, and an 802.11g compatible channel. Any of the first, second, and third embodiments wherein the first and the second wireless mesh networks operate according to partially overlapping or interfering frequency allocations. Any of the first, second, and third embodiments wherein the first and the second wireless mesh networks operate according to identical frequency allocations. Any of the first, second, and third embodiments wherein the first and the second wireless mesh networks operate according to non-overlapping or non-interfering frequency allocations.

Any of the first, second, and third embodiments wherein the first and the second wireless mesh networks operate according to respective first and second internal routing protocols. Any of the first, second, and third embodiments wherein the first and the second wireless mesh networks operate according to identical internal routing protocols. Any of the first, second, and third embodiments wherein the first and the second wireless mesh networks operate according to respective distinct internal routing protocols. Any of the first, second, and third embodiments wherein the first and the second wireless mesh networks operate according to respective distinct routing options. Any of the first, second, and third embodiments wherein the first and the second wireless mesh networks operate according to respective distinct routing parameters. Any of the first, second, and third embodiments wherein the first and the second wireless mesh networks operate according to identical internal routing protocols and each internal routing protocol is operable according to respective distinct routing options. Any of the first, second, and third embodiments wherein the first and the second wireless mesh networks operate according to identical internal routing protocols and each internal routing protocol is operable according to respective distinct routing parameters. Any of the first, second, and third embodiments wherein the first and the second wireless mesh networks operate according to identical media access control layers. Any of the first, second, and third embodiments wherein the first and the second wireless mesh networks operate according to distinct media access control layers. Any of the first, second, and third embodiments wherein the first and the second wireless mesh networks operate according to identical physical layers. Any of the first, second, and third embodiments wherein the first and the second wireless mesh networks operate according to distinct physical layers.

Fourth, fifth, and sixth embodiments comprising all of the elements, respectively, of the first, second, and third embodiments wherein the bridge link is a first bridge link; and further comprising via a second bridge link, coupling the first and the second wireless mesh networks, extending the multi-mesh network by forwarding packets between the first and the second mesh networks; and wherein the second bridge link coupling is interfaced to the first and the second wireless mesh networks via respective third and fourth mesh bridge nodes. Any of the fourth, fifth, and sixth embodiments wherein the first and second bridge link couplings are operable according to a load balancing technique. Any of the fourth, fifth, and sixth embodiments wherein the first and second bridge link couplings are operable according to a redundancy/failover technique.

Seventh, eighth, and ninth embodiments comprising all of the elements, respectively, of the first, second, and third embodiments wherein the bridge link is operable in conjunction with a bridge link protocol. Any of the seventh, eighth, and ninth embodiments wherein there are no packets dedicated for use by the bridge link protocol.

A tenth embodiment comprising a method comprising operating first and second wireless mesh networks; via first and second bridge links coupling the wireless mesh networks, forming a multi-mesh network by forwarding packets between the wireless mesh networks; and operating the bridge links according to a load balancing technique. The aforementioned embodiment further comprising preventing forwarding loops between the wireless mesh networks. The aforementioned embodiment wherein the preventing of forwarding loops comprises assigning identifiers to packets. The aforementioned embodiment wherein the packets include broadcast packets. The aforementioned embodiment wherein each identifier comprises a source address field based on a source address corresponding to a node generating the identifier. The aforementioned embodiment wherein each identifier further comprises an identification field uniquely identifying each respective packet in a context of an associated entry point into the multi-mesh network. The aforementioned embodiment wherein the associated entry point is an ingress mesh node. The aforementioned embodiment wherein the identifiers are included in pre-existing control packets.

The tenth embodiment further comprising eliminating redundant broadcast flooding within each respective wireless mesh network. The aforementioned embodiment wherein the eliminating of redundant broadcast flooding comprises assigning identifiers to packets. The aforementioned embodiment wherein each identifier comprises a source address field based on a source address of the packet corresponding to the identifier. The aforementioned embodiment wherein each identifier comprises an identification field uniquely identifying each respective packet in a context of an associated entry point into the multi-mesh network. The aforementioned embodiment wherein the identifiers are included in pre-existing control packets.

The tenth embodiment further comprising forwarding packets according to efficient routes based at least in part on route cost information. The aforementioned embodiment wherein the route cost information is accumulated in packets during bridge link traversal. The aforementioned embodiment wherein the route cost information is included in pre-existing control packets.

An eleventh embodiment comprising a method comprising operating first and second wireless mesh networks; via first and second bridge links coupling the wireless mesh networks, forming a multi-mesh network by forwarding packets between the wireless mesh networks; and operating the bridge links according to a redundancy/failover technique. The aforementioned embodiment further comprising preventing forwarding loops between the wireless mesh networks. The aforementioned embodiment wherein the preventing of forwarding loops comprises assigning identifiers to packets. The aforementioned embodiment wherein the packets include broadcast packets. The aforementioned embodiment wherein each identifier comprises a source address field based on a source address corresponding to a node generating the identifier. The aforementioned embodiment wherein each identifier further comprises an identification field uniquely identifying each respective packet in a context of an associated entry point into the multi-mesh network. The aforementioned embodiment wherein the associated entry point is an ingress mesh node. The aforementioned embodiment wherein the identifiers are included in pre-existing control packets.

The eleventh embodiment further comprising eliminating redundant broadcast flooding within each respective wireless mesh network. The aforementioned embodiment wherein the eliminating of redundant broadcast flooding comprises assigning identifiers to packets. The aforementioned embodiment wherein each identifier comprises a source address field based on a source address of the packet corresponding to the identifier. The aforementioned embodiment wherein each identifier comprises an identification field uniquely identifying each respective packet in a context of an associated entry point into the multi-mesh network. The aforementioned embodiment wherein the identifiers are included in pre-existing control packets.

The eleventh embodiment further comprising forwarding packets according to efficient routes based at least in part on route cost information. The aforementioned embodiment wherein the route cost information is accumulated in packets during bridge link traversal. The aforementioned embodiment wherein the route cost information is included in pre-existing control packets.

A twelfth embodiment of a computer readable medium having a set of instructions stored therein which when executed by a processing element causes the processing element to perform functions comprising any of the first through eleventh embodiments.

An thirteenth embodiment of a system comprising a processor and a memory adapted to store instructions to be executed by the processor, the instructions implementing any of the first through eleventh embodiments.

Mesh Scaling and Interoperability

As the size of a wireless mesh increases, using a single radio frequency in the entire mesh may become a limitation as wireless device transmissions interfere with each other. As a result, bandwidth available for nodes in the mesh decreases. Some embodiments reduce same-frequency interference effects by breaking up relatively larger meshes into smaller meshes. Each of the smaller meshes is then configured to operate at a respective unique (e.g. non-interfering) radio frequency, thus reducing interference from nodes operating in physically neighboring meshes.

Also as the size of the wireless mesh increases, memory and processing requirements associated with mesh routing protocol operation increase. Such routing protocol operations include storing information describing how to reach selected nodes of the wireless mesh and determining a next node address to send a packet to in order to proceed with forwarding the packet. Some embodiments reduce large-mesh routing protocol resource requirements by breaking up relatively larger meshes into smaller meshes. Each of the smaller meshes then operates routing protocols according to constraints associated with the respective smaller mesh. Thus splitting relatively larger meshes into smaller meshes improves scalability of mesh performance and operating resource cost.

In some usage scenarios, as mesh technology evolves, relatively newer mesh network installations may be unable to interoperate with relatively older installations. Similarly, even when a new installation and an old installation are built of the same or substantially similar technology, differing user requirements may lead to the new and the old installations being of unique configurations, capabilities, or both. Some embodiments enable interconnection of dissimilar meshes (i.e. provide for communication between meshes of differing internal configuration or operation).

As an example usage scenario, consider a mesh network deployed in a large city. The mesh network may have more than 1000 mesh nodes, and may be broken up into smaller meshes of approximately 50 nodes each. Each small mesh (or collections thereof) may be deployed independently by a different vendor, but the overall network remains operable as a multi-mesh. Various portions of the deployment may be configured for residential access, while other portions of the deployment may be configured for business access.

Mesh Interconnections and Bridging

In some embodiments a wireless mesh may be divided into smaller (sub)meshes interconnected through Mesh Bridge nodes operated in part according to a bridging protocol. A first Mesh Bridge in a first mesh network is coupled via a point-to-point (wired or wireless) link to a second Mesh Bridge in a second mesh network. The point-to-point link coupling the Mesh Bridges is referred to as a bridge link. In some embodiments a bridge link includes a plurality of point-to-point links, and in some embodiments a plurality of bridge links may enable communication between a pair of meshes. The pluralities of links and bridge links provide higher overall throughput between meshes and also optionally enable load balancing within meshes. In some embodiments nodes in each respective (sub)mesh may be configured to operate at corresponding unique/non-interfering frequencies, such that nodes in physically nearby (or adjacent) meshes operate with reduced interference. In some embodiments nodes in selected (sub)meshes may be configured to operate at identical or overlapping/interfering frequency bands if interference is not an issue. For example, a bridge link coupling (sub)meshes operating at identical or overlapping frequency bands may provide for a large enough physical separation of the coupled (sub)meshes to prevent substantial interference.

Multiple Mesh Operation

Efficient operation of interconnected multiple meshes includes techniques for reducing (or eliminating) loops, as well as optimizing unicast and broadcast packet forwarding. For a first example, if meshes are interconnected through bridge links that form a loop, then in some usage scenarios packets passed from one mesh to another are augmented with control information used to prevent the packets from being passed around the loop multiple times or in some scenarios indefinitely (and thus potentially leading the network into congestion collapse). In some usage scenarios one or more loop interconnections may be used to provide redundancy or may be an installation mistake, such as when multiple customers own various meshes in a multi-mesh and the customers lack coordination with each other.

As a second example, if multiple connections between two meshes of a multi-mesh exist, then overall multi-mesh efficiency is increased by enabling unicast packets to follow an overall best path through the multi-mesh. In other words, bandwidth, latency, and resource utilization are improved by determining a path that is most efficient with respect to the entire multi-mesh network, rather than with respect to each individual mesh.

As a third example, in usage scenarios where individual meshes of a multi-mesh distribute broadcast packets via flooding, control information is included in the broadcast packets when the packets enter the mesh (e.g. before sending across any bridge link). The control information enables reduction or elimination of redundant broadcast packet flooding that would otherwise occur when equivalent copies of a broadcast packet enter one of the individual meshes via a plurality of different bridge links, with each of the copies being treated as a distinct broadcast packet to be flooded. The control information enables suppression of the otherwise superfluous multiple floods.

As a fourth example, in some usage scenarios where loops between individual meshes of a multi-mesh are possible (such as via bridge links), control information is included in packets before sending across a bridge link. The control information enables reduction or elimination of otherwise potentially infinite looping behavior between the individual meshes that may otherwise lead to a congestion collapse.

Figure 1:
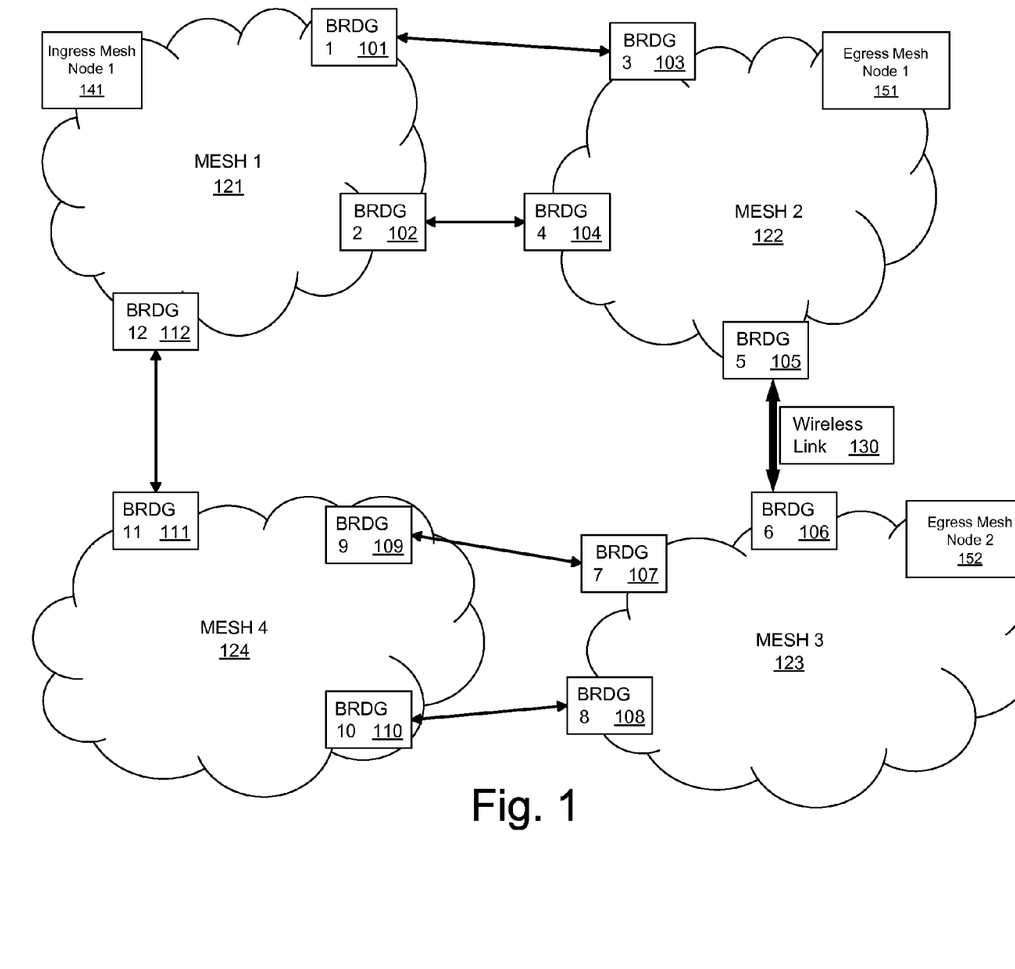
FIG. 1 illustrates selected details of various embodiments of techniques to reduce (or eliminate) loops, and to optimize unicast and broadcast packet flows of a multi-mesh.

FIG. 1 illustrates selected details of various embodiments of techniques to reduce (or eliminate) loops, and to optimize unicast and broadcast packet flows of a multi-mesh in part according to a bridging protocol. In some usage scenarios the techniques operate with no additional control packet overhead, relatively minimized control byte overhead, and reduced protocol complexity. The illustrated multi-mesh includes individual meshes Mesh 1 121, Mesh 2 122, Mesh 3 123, and Mesh 4 124. The meshes are bridged via several bridges, illustrated as Bridges 1-12 (101-112, respectively). Bridges 1 and 3 bridge Meshes 1 and 2, respectively, as do Bridges 2 and 4. Bridges 9 and 7, respectively, bridge Meshes 4 and 3, as do Bridges 10 and 8. Bridges 12 and 11 bridge Meshes 1 and 4, respectively. Bridges 5 and 6, respectively, bridge Meshes 2 and 3 via Wireless Link 130. Ingress Mesh Node 1 141 provides a portal for packets to enter the multi-mesh, for example from the Internet, a Local Area Network (LAN), a Wide Area Network (WAN), or any other suitable network. Egress Mesh Nodes 1 and 2 (151 and 152, respectively) provide portals for packets to exit the multi-mesh, for example to the Internet, a LAN, a WAN, or any other suitable network. In some embodiments a node may operate simultaneously as an Ingress Mesh Node and an Egress Mesh Node, providing portals for packet entry to and exit from the multi-mesh.

As an example of operation, when a Mesh Bridge receives a broadcast packet from one mesh (e.g. Mesh 1), the Mesh Bridge forwards the packet across a bridge link to another mesh (e.g. Mesh 2). Before forwarding the packet, the Mesh Bridge strips the packet of any routing information specific to the mesh that was just traversed mesh (e.g. Mesh 1). The stripped information includes path cost information associated with traversal of the packet through the just-traversed mesh (e.g. Mesh 1). The path cost information is appended to the packet in preparation for the forwarding. The broadcast packet is subsequently forwarded to other meshes.

Thus information relating to path cost is accumulated as the broadcast packet traverses the multi-mesh. Accumulated path cost information corresponds to the cost of forwarding a packet through each mesh the packet has traversed up to the point that the accumulated path cost information is computed (or updated). In some embodiments a mesh hop-count metric is incremented for each traversed mesh. In some embodiments a mesh-cost metric is computed and stored for each traversed mesh. In some embodiments a mesh metric-type, describing a type of cost metric associated with a mesh, is stored for each traversed mesh. In some embodiments a minimum link metric over all links is used as a path metric. Paths are compared based on the metrics. In some embodiments the comparison is based in part on the metric value, and in some embodiments the comparison is based in part on the mesh metric-type. In some embodiments the mesh metric-type serves as an (implicit) metric value (such as a "High Bandwidth" and a "Low Bandwidth" mesh metric-type context).

In some embodiments there is a bridge table having one entry for each bridge node. Each entry includes an address and a status for a destination bridge, and a next hop bridge address list. Each element of the next hop bridge address list includes a cost to the destination bridge via a bridge identified by the respective next hop bridge address, and a status of a bridge link coupling to the respective next hop bridge.

An Egress Mesh Node receiving (redundant) copies of the broadcast packet (for example due to multiple paths to the Egress Mesh Node) compares respective path costs in the copies and determines a path with a relatively best overall cost for future use. In embodiments where mesh metrics are accumulated separately and one or more metric types are unknown, portions of paths taken through a mesh may be compared.

Mesh Bridges and Egress Mesh Nodes receiving and forwarding a broadcast packet learn about a best path through each respective mesh (in the sequences of meshes the packet has traversed) by examining and processing control information included in the packet. The best path learned includes a best path between the Ingress Mesh Node of the broadcast packet and the respective Mesh Bridge and Egress Mesh Node forwarding the broadcast packet. The control information includes path cost information added as the packet has been forwarded across bridge links, a next bridge to forward a packet to along a path, and optionally Mesh Bridge nodes traversed so far along the path. In some embodiments learning about best paths through the sequence of meshes traversed is performed without knowledge of how packets are routed within each mesh (i.e. information concerning bridge links traversed is sufficient). In some embodiments learning about best paths through the sequence of meshes traversed is performed using metrics associated with the meshes traversed and a metric associated with a next bridge a packet is to be forwarded across. In some embodiments the metric is a hop-count metric, and the best path is the route having the smallest hop-count. Other metrics for best path determination may be used based on implementation dependent criteria, as the techniques discussed elsewhere herein are independent of best path determination details.

A unicast packet is forwarded by an Ingress Mesh Node to a next Mesh Bridge along the best path learned during a previous forwarding of a broadcast packet in the opposite direction (e.g., from the destination of the unicast packet). A Mesh Bridge forwards the unicast packet across a bridge link to a neighboring mesh if the packet came from a mesh the Mesh Bridge is included in. If the packet came from a neighboring mesh (e.g., across a bridge link), then the Mesh Bridge forwards the packet to a Mesh Bridge along the best path to the destination, or to an Egress Mesh Node if the mesh the Mesh Bridge is included in also includes the destination (e.g. the packet has entered the final mesh it is to traverse). A unicast packet to an unknown destination is forwarded as a broadcast flood (similar to layer-2 switch flooding) thus enabling learning bridge forwarding information for use in forwarding subsequent packets.

A unique ID is assigned to each broadcast packet by the Ingress Mesh Node where the broadcast packet enters the multi-mesh and the ID is preserved as the packet is forwarded across bridge links. The ID may be used for duplicate detection at each mesh node and at each Mesh Bridge, thus preventing loops within each mesh and also among meshes. The ID includes two elements. A first element is an address associated with the node generating the ID, and thus the first element is unique throughout the multi-mesh. A second element is a sequence number (or similar field) unique to the broadcast packet with respect to other broadcast packets identified by the node generating the ID, and thus the second element may be non-unique with respect to second elements of IDs generated by other nodes. Therefore the second element (and hence the entire ID) may be generated independently by nodes. In other words, no inter-node communication is required to generate IDs that are unique in the context of the entire multi-mesh).

In some operating scenarios identifiers are assigned to broadcast packets and in other operating scenarios identifiers are assigned to unicast and broadcast packets. Unicast packets may receive identifiers when, for example, a packet is initially sent as a unicast packet, but the unicast packet reaches a mesh bridge not having state to forward the unicast packet (for example the forwarding state may have expired). The unicast packet is then treated as a packet to an unknown destination and is flooded (like a broadcast packet) inside the mesh the mesh bridge is forwarding the unicast packet into. Subsequently the unicast packet is treated as a broadcast packet, including receiving an identifier assignment, in order to prevent looping.

Individual meshes of a multi-mesh may operate according to various characteristics, including routing protocols, routing options, Media Access Control (MAC) layers, and PHYsical access (PHY) layers. Characteristics of each mesh of the multi-mesh may be varied independently of characteristics of other meshes in the multi-mesh. For example, a first mesh may operate with a first routing protocol, while all other meshes may operate with a different routing protocol. For another example, each mesh may operate with a respective distinct routing protocol. For another example, every mesh may operate with the same routing protocol. Similar variations may be made for the other characteristics (routing options, MAC layers, and PHY layers).

Although the link enabling communication between Bridge 5 and Bridge 6 is illustrated as a wireless link (e.g. a radio link such as an 802.11 link), in some embodiments the link may be a wired link (such as an Ethernet link). In some embodiments the illustrated link is representative of a single link, while in other embodiments the illustrated link is representative of two or more links (wireless, wired, or both together). In embodiments having two or more links coupling the same two meshes, the two or more links may be operated in a load balancing manner, a failover/redundancy manner, or both.

Node Hardware and Software

Figure 2:
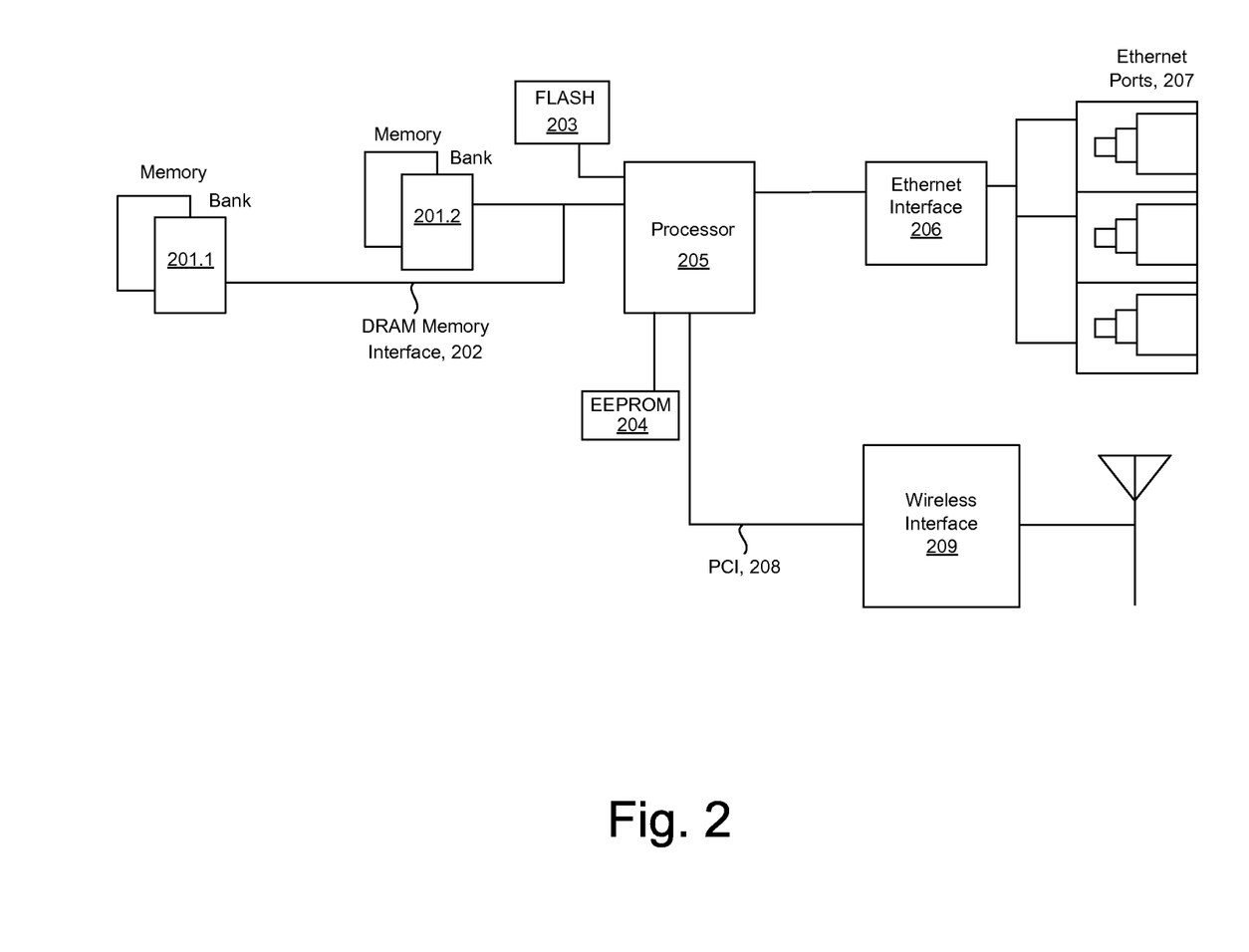
FIG. 2 illustrates selected details of hardware aspects of an embodiment of a node.

FIG. 2 illustrates selected details of hardware aspects of an embodiment of a node. The illustrated node includes Processor 205 coupled to various types of storage, including volatile read/write memory "Memory Bank" elements 201.1-2 via DRAM Memory Interface 202, and non-volatile read/write memory FLASH 203 and EEPROM 204 elements. The processor is further coupled to Ethernet Interface 206 providing a plurality of Ethernet Ports 207 for establishing wired links, and Wireless Interface 209 providing radio communication of packets for establishing wireless links. In some embodiments the Wireless Interface is compatible with an IEEE 802.11 wireless communication standard (such as any of 802.11a, 802.11b, and 802.11g). In some embodiments the Wireless Interface operates (in conjunction with any combination of hardware and software elements) to collect statistics with respect to neighboring nodes of a mesh. The statistics may include any combination of signal strength and link quality. In some embodiments the Wireless Interface is configurable to drop all packets below a settable Received Signal Strength Indicator (RSSI) threshold. The illustrated partitioning is only one example, as other equivalent embodiments of a node are possible.

The illustrated node may function as any one of the nodes illustrated in FIG. 1, including an Ingress Mesh Node, an Egress Mesh Node, and a Bridge. The Wireless Interface of FIG. 2 may enable communication with nodes internal to the mesh (not explicitly illustrated in FIG. 1, but understood to be elements of each of Meshes 1, 2, 3, and 4). The Wireless Interface may also provide a wireless Bridge Link when a node in accordance with FIG. 2 is used as a Bridge Node, for example any of Bridges 1 through 12 of FIG. 1. The Ethernet Interface of FIG. 2 may provide Ethernet ports for wired bridge links (including load-balancing or redundancy/failover Bridge Links) in embodiments in accordance with FIG. 1 having one or more wired links. One or more of the Ethernet ports provided by the Ethernet Interface may also be used to provide pathways for packets entering (exiting) the mesh when a node according to FIG. 2 is operated as an Ingress (Egress) Mesh Node. Any combination of the storage elements (DRAM, FLASH, and EEPROM) may store one or more bridge tables, according to various usage scenarios.

In operation the processor fetches instructions from any combination of the storage elements (DRAM, FLASH, and EEPROM) and executes the instructions. Some of the instructions correspond to software associated with operating the Bridge Links in conjunction with a bridge link protocol. Portions of the bridge link protocol control operation of any combination of the Wireless Interface and the Ethernet Interface. Accumulated path cost information may be stored in any combination of the storage elements according to instructions executed during processing associated with the bridge link protocol.

Figure 3:
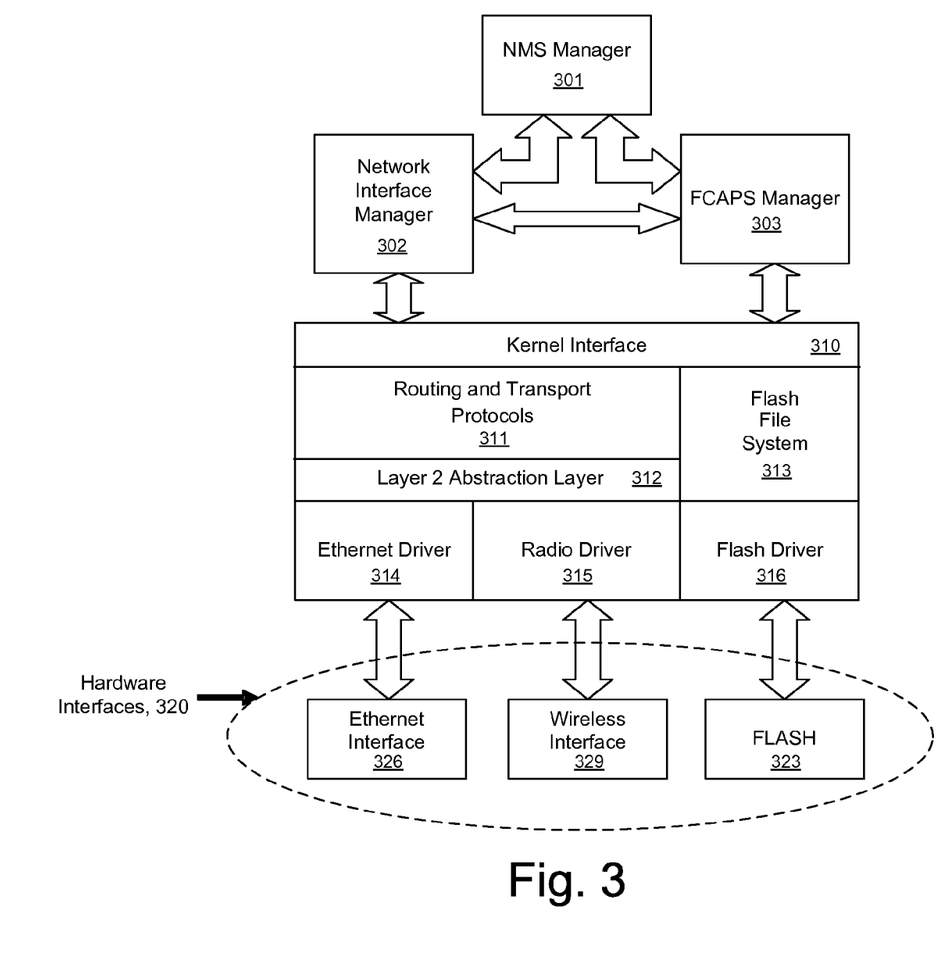
FIG. 3 illustrates selected details of software aspects of an embodiment of a node.

FIG. 3 illustrates selected details of software aspects of an embodiment of a node. The illustrated software includes Network Management System (NMS) Manager 301 interfacing to Network Interface Manager 302 and Fault, Configuration, Accounting, Performance, and Security (FCAPS) Manager 303. In some embodiments the NMS interfaces between management software operating external to the node and software operating internal to the node (such as various applications and FCAPS). The Network Interface Manager manages physical network interfaces (such as the Ethernet and Wireless Interfaces of a node). The Network Interface Manager assists the NMS in passing dynamic configuration changes (as requested by a user) through the management software to FCAPS. In some embodiments FCAPS includes functions to store and retrieve configuration information, and FCAPS functions serve all applications requiring persistent configuration information. FCAPS may also assist in collecting fault information and statistics and performance data from various operating modules of the node. FCAPS may pass any portion of the collected information, statistics, and data to the NMS.

Kernel Interface 310 interfaces the Managers to Routing and Transport Protocols layer 311 and Flash File System module 313. The Routing Protocols include the bridge link protocol and portions of software relating to maintenance of and reference to a bridge table. The Transport Protocols include TCP and UDP. The Flash File System module interfaces to Flash Driver 316 that is illustrated conceptually coupled to FLASH hardware element 323 that is representative of a flash file system stored in any combination of the FLASH and EEPROM elements of FIG. 2. Layer-2 Abstraction Layer 312 interfaces the Routing and Transport Protocols to Ethernet and Radio Drivers 314 and 315, respectively. The Ethernet Driver is illustrated conceptually coupled to Ethernet Interface 326 that is representative of the Ethernet Interface of FIG. 2. The Radio Driver is illustrated conceptually coupled to Wireless Interface 329 that is representative of the Wireless Interface of FIG. 2. In some embodiments the software may also include a serial driver. The software is stored on a computer readable medium (e.g. any combination of the DRAM, FLASH, and EEPROM elements), and is executed by the processor. The illustrated partitioning is an example only, as many other equivalent arrangements of layers are possible.

Conclusion

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The order and arrangement of flowchart and flow diagram process and function elements may generally be varied. Also, unless specifically stated to the contrary, the value ranges specified, the maximum and minimum values used, or other particular specifications (such as integration techniques and design flow technologies), are merely those of the illustrative embodiments, can be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. The names given to interconnect, logic, functions, and routines are merely illustrative, and should not be construed as limiting the concepts taught. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in networking technology (such as wired/wireless, protocols, and bandwidths); and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, omitted components are not limiting on the concepts taught herein.

All such variations in design comprise insubstantial changes over the teachings conveyed by the illustrative embodiments. It is also understood that the concepts taught herein have broad applicability to other networking and communication applications, and are not limited to the particular application or industry of the illustrated embodiments. The invention is thus to be construed as including all possible modifications and variations encompassed within the scope of the claims appended to the issued patent.

What is claimed is:

1. A method comprising:
    passing packets between first and second wireless mesh networks, at least in part via first and second mesh bridge nodes respectively associated with and respectively coupled to the first and the second wireless mesh networks, to form a multi-mesh network;
    preventing forwarding loops between the wireless mesh networks, the preventing forwarding loops being performed at least in part via one or more of the mesh bridge nodes; and
    wherein the preventing forwarding loops is via duplicate detection based in part on identifiers assigned to respective ones of at least some of the packets, each respective identifier comprising a respective first portion and a respective second portion, the respective first portion uniquely identifying a respective entry point of the respective packet into the multi-mesh network, and the respective second portion uniquely identifying each respective packet in a context of the respective entry point.

2. The method of claim 1, wherein the identifiers are comprised in pre-existing control packets.

3. The method of claim 1, wherein the identifiers are comprised in pre-existing data packets.

4. The method of claim 1, further comprising
    accumulating route cost information at least in part during the passing packets, the accumulating route cost information being performed at least in part via the mesh bridge nodes, the accumulated route cost information corresponding to a cost of forwarding a respective packet through each wireless mesh network the respective packet has traversed up to an update of the accumulated route cost information, the accumulating route cost information comprising stripping route cost information specific to a just-traversed wireless mesh network from the respective packet and appending to the respective packet respective route cost information for the just-traversed wireless mesh network; and
    forwarding at least some of the packets, at least in part via the mesh bridge nodes, according to efficient routes based at least in part on the accumulated route cost information.

5. The method of claim 4, wherein the accumulating route cost information is performed at least in part during bridge link traversal.

6. The method of claim 4, wherein the accumulating route cost information is performed at least in part during traversal of at least one of the wireless mesh networks.

7. The method of claim 1, further comprising eliminating redundant broadcast packet flooding within each respective wireless mesh network, the eliminating redundant broadcast packet flooding being performed at least in part via one or more of the mesh bridge nodes.

8. The method of claim 7, wherein the eliminating redundant broadcast packet flooding is based in part on the identifiers.

9. The method of claim 8, wherein the identifiers are comprised in pre-existing control packets.

10. The method of claim 8, wherein the identifiers are comprised in pre-existing data packets.

11. A system comprising:
    a processing element coupled to a memory;
    a wireless interface enabling wireless communication with a plurality of nodes of a first wireless mesh network and at least partially enabling operation of the system as a first bridge node with respect to the first wireless mesh network;

a communication interface enabling communication via a bridge link to a second bridge node coupled to a second wireless mesh network;

wherein the first and the second bridge nodes are respectively enabled to couple to the first and the second wireless mesh networks;

wherein the processing element is enabled to execute instructions fetched from the memory and enabling functions comprising passing packets between the first and the second wireless mesh networks, at least in part via the bridge link, to form a multi-mesh network, and preventing forwarding loops between the wireless mesh networks; and wherein the preventing of forwarding loops is via duplicate detection based in part on identifiers assigned to respective ones of at least some of the packets, each respective identifier comprising a respective first portion and a respective second portion, the respective first portion uniquely identifying a respective entry point of the respective packet into one of the wireless mesh networks, and the respective second portion uniquely identifying each respective packet in a context of the respective entry point.

12. The system of claim 11, wherein the identifiers are comprised in pre-existing control packets.

13. The system of claim 11, wherein the identifiers are comprised in pre-existing data packets.

14. The system of claim 11, wherein the functions further comprise accumulating route cost information at least in part during the passing packets, the accumulated route cost information corresponding to a cost of forwarding a respective packet through each wireless mesh network the respective packet has traversed up to an update of the accumulated route cost information, the accumulating route cost information comprising stripping route cost information specific to a just-traversed wireless mesh network from the respective packet and appending to the respective packet respective route cost information for the just-traversed wireless mesh network; and forwarding at least a portion of the packets according to efficient routes based at least in part on the accumulated route cost information.

15. The system of claim 11, wherein the functions further comprise eliminating redundant broadcast packet flooding within each respective wireless mesh network.

16. The system of claim 15, wherein the eliminating redundant broadcast packet flooding is based in part on the identifiers.

17. A system comprising:

means for passing packets between first and second wireless mesh networks, operable at least in part via first and second mesh bridge nodes respectively associated with and respectively coupled to the first and the second wireless mesh networks, to form a multi-mesh network, the first and the second mesh bridge nodes being connected to each other via a bridge link;

means for preventing forwarding loops between the wireless mesh networks, operable at least in part via one or more of the mesh bridge nodes; and wherein the means for preventing forwarding loops operates via duplicate detection based in part on identifiers assigned to respective ones of at least some of the packets, each respective identifier comprising a respective first portion and a respective second portion, the respective first portion uniquely identifying a respective entry point of the respective packet into the multi-mesh network, and the respective second portion uniquely identifying each respective packet in a context of the respective entry point.

18. The system of claim 17, further comprising means for accumulating route cost information at least in part during the passing packets, the means for accumulating route cost information operable at least in part via the mesh bridge nodes, the accumulated route cost information corresponding to a cost of forwarding a respective packet through each wireless mesh network the respective packet has traversed up to an update of the accumulated route cost information, the means for accumulating route cost information comprising means for stripping route cost information specific to a just-traversed wireless mesh network from the respective packet and means for appending to the respective packet respective route cost information for the just-traversed wireless mesh network; and means for forwarding at least some of the packets, at least in part via the mesh bridge nodes, according to efficient routes based at least in part on the accumulated route cost information.

19. The system of claim 17, further comprising means for eliminating redundant broadcast packet flooding within each respective wireless mesh network, the means for eliminating redundant broadcast packet flooding operable at least in part via one or more of the mesh bridge nodes.

20. The system of claim 19, wherein the means for eliminating redundant broadcast packet flooding operates based in part on the identifiers.

* * * * *